United States Patent [19]
Winsel

[11] 3,785,870
[45] Jan. 15, 1974

[54] METHOD AND APPARATUS FOR THE REMOVAL OF CARBON DIOXIDE FROM GAS MIXTURES AND FUEL CELL COMBINATION

[75] Inventor: August Winsel, Kelkheim in Taunus, Germany

[73] Assignee: Varta Aktiengesellschaft, Frankfurt/Main, Germany

[22] Filed: Mar. 24, 1972

[21] Appl. No.: 238,249

[30] Foreign Application Priority Data
Mar. 27, 1971 Germany............... P 21 14 920.2

[52] U.S. Cl. .............................. 136/86 C, 136/86 R
[51] Int. Cl. .......................................... H01m 27/12
[58] Field of Search ..................... 136/86 E, 86 R

[56] References Cited
UNITED STATES PATENTS
| | | | |
|---|---|---|---|
| 3,411,951 | 11/1968 | Gelting | 136/86 R |
| 3,511,712 | 5/1970 | Giner | 136/86 R |
| 3,666,405 | 5/1972 | Winsel | 136/86 E |

Primary Examiner—A. B. Curtis
Assistant Examiner—H. A. Feeley
Attorney—Gerard J. Weiser

[57] ABSTRACT

Carbon dioxide is removed from a gaseous mixture containing carbon dioxide and hydrogen by washing the gas mixture with a liquid in an absorber where the carbon dioxide is absorbed, and desorption thereof in a desorber. The absorber and desorber contain a biporous element having a pore system of high capillary pressure and a pore system of low capillary pressure.

23 Claims, 1 Drawing Figure

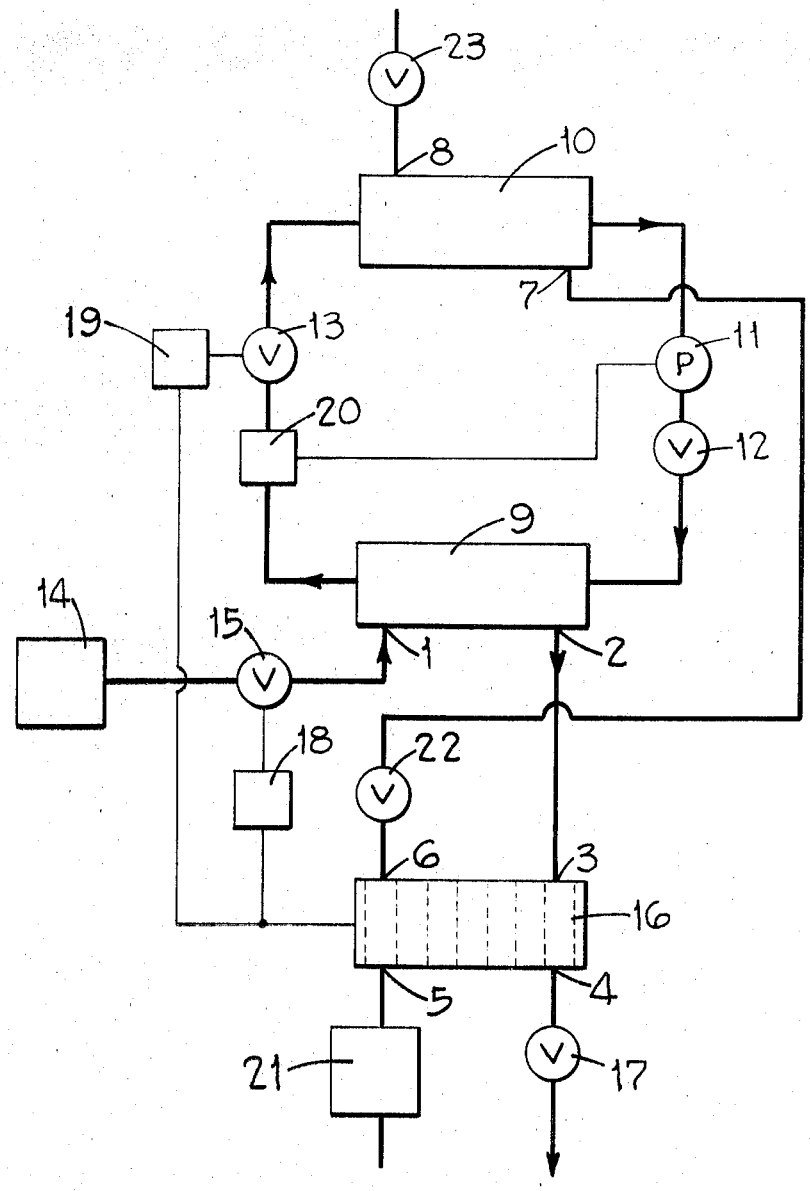

METHOD AND APPARATUS FOR THE REMOVAL OF CARBON DIOXIDE FROM GAS MIXTURES AND FUEL CELL COMBINATION

The present invention relates to the removal of carbon dioxide from a gaseous mixture by washing with a liquid and more particularly to the purification of crude gas from a reformer, the purified gas being specially suited for the reaction in alkaline hydrogen-oxygen fuel cells. The gaseous mixture is passed through a porous body having a pore system of high capillary pressure and a pore system of low capillary pressure.

Recently fuel cells have been developed which are well suited for the electro-chemical reaction of hydrogen and oxygen. This type of fuel cell is usually operated with an alkaline electrolyte. The hydrogen is passed in these cells to a gas diffusion electrode in the pores of which both the hydrogen and the electrolyte are present. As a result thereof, the $H_2$-molecules are chemisorbed and dissociated at the surface of the catalyst and after hydratization and with the loss of an electron, the protons thus formed pass into the electrolyte. In the case of hydrophylic electrode bodies, the gas is held at a certain pressure which counteracts the capillary pressure of the electrolyte. In this manner, one prevents that the large pores be completely filled with electrolyte. Vice versa, in the case of hydrophobic electrodes, the electrolyte is held at slight pressure, so that it partially permeates also the large or coarse pores. In both cases, the small pores are filled with electrolyte, the larger pores with gas, and both fluids contact each other since the pores are intercommunicating.

If carbon dioxide is present in the reaction gas mixture, alkali carbonates are formed in fuel cells using alkaline electrolyte. The alkali carbonate precipitates in the proximity of the menisci of the electrolyte at the pore walls and grows into the gas space of the individual pores so that the reaction in the electrodes is terminated after short periods of operation. It is possible to prevent this build-up by circulation of the electrolyte, whereby the carbonates are dissolved and transported into the free electrolyte space. However, in this case the formation of the carbonate has the disadvantage of reducing the conductivity of the electrolyte and reducing the concentration of the OH-ions needed for the reaction, thereby reducing the output of the cell. Already after relatively short periods of operation the total amount of available potassium hydroxide of the electrolyte is converted into carbonate with the result that the fuel cell becomes inoperative.

For the above reason, it is necessary that alkaline fuel cells be operated with hydrogen gas which does not contain any or contains a decreased or minimum of carbon dioxide. Hydrogen generated in a reformer from hydrocarbons contains normally about 25 percent by volume carbon dioxide, which must be washed out of the gaseous mixture prior to the feeding of the gaseous mixture into the alkaline fuel cell. The other gases in a reforming gas reaction product may include carbon monoxide and methane. There is generally no serious problem to achieve the removal of the carbon dioxide in large scale production operations by washing the gas in suitable liquids. This known operation may be accomplished by the use, for instance, of a bicarbonate equilibrium solution, of solution of mono-, di- or trimethanolamine or of the well known Alkazid alkalisolutions. All of these solutions absorb carbon dioxide at a low temperature and release it at a high temperature.

On smaller scale operations, however, these measures are not suitable and no satisfactory method or apparatus has yet been proposed which is capable of producing hydrogen gas adequately free of carbon dioxide for use in devices where hydrogen of high purity is needed. For the miniaturization of the known large scale wash processes it is necessary to provide a common interface between the gas and the wash liquid of the washer as large as possible per unit of volume.

This has now been achieved by the method and system of the invention which comprises washing the gas with a washing liquid, in accordance with the procedures described hereinafter, within a special biporous body. Such biporous body contains two pore systems, a system of coarse or large pores and a system of fine or small pores. At the operating pressure of the gas with respect to the liquid phase, the fine pores are filled with the washing liquid and the coarse pores are filled with the gas mixture. Since both pore systems are interconnected, (communicating with each other by virtue of an open pore system) both the liquid and the gaseous phase can be moved in contact with each other. The relative movement of the gas and liquid in accordance with the invention can be effected by moving the liquids and gas in any desired manner, such as concurrent, cross-over or counter-current. However, best washing results are achieved when the movement is effected in a counter-current fashion. Operation in cross-over fashion is more effective and preferred over concurrent stream feeding. However, when the cross-over procedure is used generally it is desirable to employ a plurality of cross streamers in such fashion, that the end effect is a countercurrent system between the washing solution and the gas to be washed.

FIG. 1 is a flow sheet of the process and devices of the invention. The biporous washing body used in the invention may be made as is known from corrosion resistant metal powders, and if desired from the metal powders, which have been made corrosion resistant by electrochemical treatment. The washing units may, however, also be made from sintered plastic powders or from asbestos. Preferably, the coarse pore system is formed in the fine pore system by the inclusion in the sinter process of a coarse filler material mixed into the fine metal or plastic powder. The latter produces the fine pore system, while the coarse filler material is, after solidification of the body, dissolved out or evaporated to produce the coarse pore system.

An interconnected coarse pore system can be readily produced by the use of filamentary fillers within the finely porous main body. The filamentary fillers are thereby arranged in such manner, that they terminate only at opposite surfaces of the finely porous body. In this manner, the other surfaces of the body contain only openings of the fine pore system. In such body the introduction and removal of the gas is effected at the two opposite surfaces comprising the openings of the coarse filamentary pores. The washing liquid is introduced into the body and removed therefrom via two opposite surfaces containing only openings of the fine pore system.

A biporous body useful in the practice of this invention containing the two pore systems can also be produced by drilling a system of parallel pores into a homogeneous body comprising uniform fine pores. The converse can also be carried out, though not as practical.

Suitable biporous bodies for the practice of the invention are disclosed in U.S. Pat. application, Ser. No. 630,128, filed Apr. 11, 1967, which is incorporated herein by reference. The biporous bodies used in the practice of the invention can be, as is known in the prior art, hydrophobic or hydrophillic, the latter type being more commonly preferred. Generally the volume of large and small pores is substantially equal.

In accordance with the invention, a plurality of this type of biporous bodies comprising the coarse and fine pores may be employed in series in such manner, that the liquid and gas flow in each individual body in crossover fashion, while the gas passes successively through the wash bodies in counter-current fashion to the washing liquid. The washing and desorption or release of the gas are effected in two separate steps at different temperatures. Since the desorption process is the reversal of the absorption process, absorption and desorption may be effected in bodies of the same basic construction or in the same body. It is important that there be maintained between the gas phase and the liquid phase a differential in pressure in such manner, that the coarse pore system remains filled with gas and the fine pore system remains filled with washing liquid. In order to assure trouble-free operation it is advisable that this differential not exceed certain upper and lower limits.

If it is desired to use the purified hydrogen gas in a consumer, which itself operates under a pressure, it is highly desirable that the hydrogen gas be fed to the consumer unit at a pressure suitable for use therein. For instance, where a fuel cell is to be fed with the hydrogen gas it is desirable that the absorption of the carbon dioxide be effected at a pressure, which makes it possible to directly pass the hydrogen gas freed from the carbon dioxide for consumption to the gas diffusion electrodes of the fuel cell without further compression. Since the gas diffusion electrodes require, in view of their pore structure for their operation a certain excess pressure, (which may be for example, 1 atmosphere excess pressure), the required pressure of the gas after completion of the washing of the gas is preselected.

It is another embodiment and object of the present invention to provide a reliable operation of a gas washer and of a fuel cell in unitary operation with a minimum of control elements.

Other objects will become apparent from the attached drawing and from the description of the invention.

These objects are achieved by the unitary operation of a gas washer and a fuel cell in the above described manner, whereby the pressure differential between the average hydrostatic pressure within the liquid in the absorber and the average pressure of the electrolyte in the fuel cell is set to a predetermined value, which results in the desired operational pressure of the purified gas.

FIG. 1 represents schematically, in form of a flow diagram, the operation of a washing unit and of a fuel cell in integrated unitary operation. The main two operational units, an absorber 9 and desorber 10 are shown schematically, in combination with a fuel cell wherein the cells thereof are not shown. The other means are flow and pressure adjusting means further described below. The $CO_2$- washing device comprises absorber 9 and desorber 10, between which the washing solution is circulated. The circulation of the washing liquid is effected by pump 11, which draws in the solution freed from $CO_2$ from the outlet of desorber 10 and which feeds the solution over check valve 12 into absorber 9. From absorber 9 the liquid flows, over valve 13, back to desorber 10. The conversion of the hydrocarbons with water into the hydrogen-carbon dioxide mixture is effected in hydrogen reformer 14, from where it is supplied at a certain excess pressure over atmosphere pressure, the gas mixture being passed, at 1, over pressure reducing valve 15 at a constant pressure into absorber 9. The gas mixture streams through absorber 9 countercurrently to the washing liquid. The purified hydrogen being free from carbon dioxide leaves absorber 9 at 2. From here the hydrogen is led directly to the hydrogen anodes of fuel cells 16 which it enters at 3.

As is apparent, the gas filled pores of the absorber are in series with the gas filled pores of the hydrogen electrodes of the fuel cells. Since the liquid filled fine pores in wash body 9 do not correspond with respect to their capillary pressure to that of the hydrogen anodes, the hydrostatic pressures within fuel cells 16 and within the absorber 9 must be adjusted with respect to each other. The aspect of the invention of controlling the hydrostatic pressures and setting a predetermined pressure differential between the average hydrostatic pressure within the liquid in the absorber and the liquid in the electrolyte of the fuel cell is one of the distinguishing features of the present invention.

In a known embodiment of a fuel cell battery the anodes are arranged in groups which are connected in series for their operation with hydrogen. Since the gas conducting lines and the electrodes have a certain resistance to flow, a pressure differential exists between the inlet of the hydrogen at 3 and outflow 4 of fuel cells 16. The pore system of the electrodes is dimensioned in such manner, that even at highest load the hydrogen pressure at outflow 4 of fuel cells 16 is still high enough to keep the electrolyte out of the gas pores of the hydrogen electrodes. For gas pressure $P_4$ at the end of the fuel cells 16 it is therefore required, that $P_4$ be larger than the hydrostatic pressure in the electrolyte plus the capillary pressure of the gas pores. Valve 17 is, in known manner, controlled by the potential of the hydrogen electrode at the gas outlet in such manner that the inert gas collected in the cell is always vented off from the battery before the battery stops operating because of the accumulation of non-reactive gas.

The average hydrostatic pressure in the fuel cell being $P_E$, the average hydrostatic pressure $P_A$ in the absorber should be adjusted in accordance with the invention in such manner, that the following condition applies:

$$P_E - P_A \leq P_{KA1} - P_{K1}$$

$P_{KA1}$ is the capillary pressure of the gas filled pores in the absorber and $P_{K1}$ is the capillary pressure of the gas filled pores of the hydrogen electrodes. If the hydrostatic pressure of the electrolyte in the fuel cell equals atmospheric pressure, $P_E$ has a value of 1.

The relationship between the hydrostatic pressure of the liquid in the fuel cell and of the hydrostatic pressure of the liquid in the absorber stated above is not sufficient, if taken alone, to provide optimum operation of the unit. It is also required that the gas pressure within the fuel cell be greater in each electrode than the sum of hydrostatic pressure $P_E$ of the electrolyte and capillary pressure $P_{K1}$. The following equations follow:

$$P_3 \geq P_E + P_{K1}$$
$$P_4 \geq P_E + P_{K1},$$

and $$P_3 \geq P_4$$

Correspondingly the following conditions applies for the absorber:

$$P_1 \geq P_2 \geq P_4 + P_{KA1}$$

On the other hand, the gas pressure in none of the porous bodies must exceed the hydrostatic pressure of the surrounding liquid to such degree that it exceeds the capillary pressure of the finely porous system. Therefrom the following conditions can be derived for the fuel cell:

$$P \leq P_3 \leq P_E + P_{K2},$$

and $$P \leq P_1 \leq P_A + P_{KA2}$$

$P_{K2}$ herein is the capillary pressure of the electrolyte-filled fine pores and of the pores in the cover layers of the hydrogen diffusion electrodes, if these are constructed for instance from two layers with a finely porous cover layer, as is known. Correspondingly, $P_{KA2}$ is the capillary pressure of the fine pores in the biporous absorption bodies which is filled with the washing solution, it being necessary that these fine pores be filled with the washing liquid.

From the foregoing conditions and requirements for the gas pressures, the requirements for the washing method of the invention and for the device of the invention can be readily derived. Suitable ranges for the values of the symbols used above are disclosed further below. The pressure drop, $P_2$ less $P_1$ is preferably not over 1 atü, more especially 0.01 to 0.1 atü. The pressure drop $P_3$ less $P_4$ does not, for preferred operating conditions, exceed the operating pressure of the hydrogen electrodes by more than 50 percent.

Pressure reducing valve 15 is adjusted in such manner that the pressure of the gas emanating from reformer 14 is reduced to a value $P_1$, which is reduced to come within the following limits:

$$P_E + P_{K1} \leq P_1 \leq P_E + P_{K2}$$

Pressure $P_1$ lies in the range of the operating pressure of the hydrogen electrodes in the fuel cells.

If $P_E$ is a variable, e.g. in a closed fuel cell system, a constant pressure differential $P_1 - P_E$ can be achieved by the use of a corresponding pressure adjustment device. Correspondingly, valve 13 is set up or controlled in such manner, that it permits passage of the washing liquid from the absorber to the desorber, if pressure $P_A$ exceeds as against pressure $P_E$ a predetermined value, which is given by the condition $$P_E - P_A \leq P_{KA1} - P_{K1}$$

Therefore, valve 13 may have the characteristic of a safety valve which opens at the predetermined pressure differential.

In FIG. 1, bodies 18 and 19 designate the pressure controlling devices, which control the working pressures of valves 13 and 15 in relation to $P_E$.

The circulation of the washing liquid between absorber 9 and desorber 10 should be adjusted to the output of the fuel cells. This is achieved in accordance with the invention by using a concentration sensor 20, in the washing solution at a predetermined location in the absorber section of the compound device. This sensor may be designed to measure the carbon dioxide concentration in the washing solution e.g. by measuring the pH-value, the conductivity or any other desirable physical or chemical parameters. The sensor provides the signals for the control of pump pressure 17, which in turn determines the amount of washing solution passed to the absorber 9 and thus adapting the circulating flow of the washing solution to the output of the fuel cells.

In systems, in which the oxygen of the air is used in the fuel cell, nitrogen emanating from the cell may be utilized for driving out of the carbon dioxide in the desorber. This feature increases the effectiveness of the desorber. For this purpose, the nitrogen is lead to the above described cross-over currents so that it streams counter-currently to the washing solution. In this manner, the stream of nitrogen takes up more and more carbon dioxide and is eventually blown into the free atmosphere. This embodiment is shown in the attached FIGURE. The air drawn in by compressor 21 is passed to the oxigen electrodes of fuel cells 16 at 5 and the waste gas leaves the oxigen electrode at 6 over valve 22. Valve 22 is thereby preferably controlled by the pressure or by any other parameter which depends on the concentration of oxigen in the outflowing gas mixture. The control is effected thereby in such manner that neither too much oxygen remains in the waste gas nor that the voltage of the cell drops too much as a result of accumulation thereof. The air or waste gas leaving the fuel cell battery, or part thereof, is led into desorber 10 at 7 and leaves it at 8 being released into the free atmosphere. Desorber 10 is maintained at a temperature and/or pressure elevated enough to free the $CO_2$ gas from the liquid.

At the outlet side of desorber 10 there is provided valve 23 which operates like a safety check valve. This valve assures that the gas pressure in the desorber is always greater than the sum of the hydrostatic pressure $P_D$ of the washing liquid and the capillary pressure $P_{KD1}$ of the gas pores in the biporous bodies. It assures also that the gas pressure in the desorber is always smaller than the corresponding sum of hydrostatic pressure $P_D$ and the capillary pressure $P_{KD2}$ in the liquid filled fine pores of the washing bodies. It is preferred to pass the whole amount of waste gas through desorber 10 because this makes possible to maintain at a minimum the partial pressure of the liquid which leaves the desorber.

It is to be noted that the process of the invention is operative over a wide range of conditions. The hydrostatic pressure at which fuel cells are operated varies depending on the objects sought to be attained and particular other variables, in particular the need to circulate electrolyte, as is known. The operating hydrostatic pressure can be negative, as is disclosed in U.S. Pat. No. 3,342,641 to Burhorn et al., or operating pressures exceeding atmospheric pressure, have been disclosed in U.S. Pat. No. 667,298 ranging from 400 to 584 p.s.i. Other conditions are disclosed in FUEL CELL SYSTEMS, VOLUMES I AND II, "Advances in Chemistry Series," American Chemical Society, Washington, D.C., 1965-1969. This literature is incorporated herein by reference. Conventionally, it is preferable to operate at or about atmospheric pressure or somewhat thereover.

The hydrogen, likewise is made available under a wide range of pressures in the system of the invention, as from about 0.1 to about 3 atü, this pressure being satisfactory to maintain the large pores of the system free of electrolyte in a hydrophilic porous body. About 0.4 to 1 atü is a preferred operative range.

Since the hydrogen pressure in the absorber approximates that which prevails at the inlet end of the battery, the hydrostatic pressure inside the absorber is determined by the capillary pressure in the large and small pores of the biporous body. With metallic porous bodies there prevails a capillary pressure which is essentially that prevailing in the hydrogen electrodes of the battery. The hydrostatic pressure of the absorber is essentially equivalent to that of the fuel cell battery. A practical range is from about 1 to about 50 atü. For the construction of the absorber and the desorber, hydrophilic materials are preferred wherein the capillary pressure in the small pressure approximates 0.1 atü and in the large pores 0.01 atü.

In the practice of the invention, the absorber is preferably operated at a pressure which is substantially equivalent to that under which the fuel cell is traditionally operated. The differential in pressure between the absorber and the fuel cell is, therefore, in the range of 0 and 3 atü, preferably as close to zero as possible.

In the equations given above the following symbols have the following values $P_E$ = 1 to 50 atü, preferably 0.4 to 3 atü
$P_A$ = 1 to 50 atü, preferably 0.4 to 3 atü
$P_{K1}$ = 0.01 to 2 atü, preferably 0.04 to 1 atü
$P_{K2}$ = 0.1 to 10 atü, preferably 0.4 to 3 atü
$P_{KA1}$ = 0.001 to 1 atü, preferably 0.01 to 0.4 atü
$P_{KA2}$ = 0.01 to 3 atü, preferably 0.01 to 1 atü

The device, system and methods of the invention, are especially useful where the hydrogen is obtained under conditions requiring control of the gas pressure, as is the case in gas consumption hydrogen fed and operated engines.

I claim:

1. A method comprising the absorber steps of contacting a gas mixture including crude reformer gas containing hydrogen and carbon dioxide with a washing liquid in a biporous absorber body, said body having a pore system of high capillary pressure and a pore system of low capillary pressure, passing the gas in the large pores to contact a liquid phase in the smaller pores, absorbing the carbon dioxide into the liquid, carrying it away from the hydrogen, driving out the absorbed carbon dioxide in a desorber, feeding the purified hydrogen gas to the hydrogen electrodes of at least one fuel cell comprising an alkaline electrolyte, circulating the washing liquid to the desorber and back to the absorber and the step of adjusting and maintaining the pressure differential between the average hydrostatic pressure of said washing liquid while in the absorber and the average pressure of the electrolyte in said fuel cell at a predetermined value.

2. The method of claim 1, in which the pressure differential between the washing liquid and the electrolyte in the fuel cell is maintained so that the gas pressure is insufficient to blow the washing liquid from the fine pores in the said biporous absorber body, while the gas pressure is sufficiently high to maintain the coarse pores of the biporous body free of the washing liquid.

3. The method of claim 2, in which the gas pressure in the abosorber is controlled by a valve which controls the flow of the washing liquid from the absorber to the desorber.

4. The method of claim 1, in which the circulation of the washing liquid is controlled by the concentration of the carbon dioxide in the washing liquid measured at the exit side of the absorber.

5. The method of claim 1, in which the passage of the gas is effected by a valve provided at the exit of the fuel cell battery, whereby the said valve is controlled by the power output of the last cell of the fuel cell battery, having its cells in a cascade-like arrangement.

6. The process of claim 1 wherein the rate of flow of the washing solution corresponds substantially to the output rate of the fuel cell.

7. The process of claim 1 wherein a temperature differential is maintained between the absorption stage and the desorption stage, the differential being effective to cause absorption of the gas in the first stage and release at the second stage.

8. The process of claim 1 wherein the purified hydrogen gas is fed to the fuel cell without further compression.

9. The process of claim 1 wherein the pressure at the end of the fuel cell is maintained high enough to be greater than the sum of the hydrostatic pressure of the electrolyte and the capillary pressure of the gas on the pores.

10. The process of claim 1 wherein the average hydrostatic pressure $P_A$ in the absorber is maintained to satisfy the following condition $$P_E - P_A \geq P_{KA1} - P_{K1}$$

wherein $P_E$ is the average hydrostatic pressure in the fuel cell, $P_{KA1}$ is the capillary pressure of the gas filled pores in the absorber and $P_{K1}$ is the capillary pressure of the gas filled pores of the hydrogen electrodes.

11. The process of claim 10 wherein $P_E$ is about 1.0.

12. The process of claim 10 wherein the gas pressure within the fuel cell is greater in each electrode than the sum of the hydrostatic pressure $P_E$ of the electrolyte and capillary pressure $P_{K1}$.

13. The process of claim 10 wherein the gas fed to the absorber is maintained at a pressure within the range of the operating pressure of the hydrogen cells of the fuel cells.

14. The process of claim 8 wherein oxygen is fed to the fuel cell, nitrogen is given off and the nitrogen is supplied to the desorber, where it drives out the carbon dioxide.

15. The method of claim 1 wherein the average hydrostatic pressure of the washing liquid while in the absorber is maintained so as to be higher than the average pressure of the electrolyte in the fuel cell.

16. In combination with a fuel cell, a device for feeding a purified gas to a fuel cell, which device comprises a biporous absorber body having large and small interconnecting pores, the large pores being adapted to contain a gas and the small pores being adapted to contain a liquid, a desorber body in communication with the biporous absorber body by means for circulating a liquid from the biporous absorber body to the desorber back to the biporous body, a fuel cell comprising anodes connected in series with the gas-filled pores of the biporous absorber body, means for supplying in a controllable manner a gas to be purified to the biporous absorber body, means for supplying an oxygen-containing gas to the oxygen electrodes of the fuel cells, means for circulating air from said cells to the desorber and means for releasing the gas to be removed from the desorber with the air fed thereto.

17. The device of claim 16 which comprises means for feeding air to the oxygen electrodes of the fuel cell.

18. The device of claim 16 which comprises a controlling means for controlling the intake of oxygen relative to the oxygen content of the fuel cell.

19. The device of claim 16 which comprises heating means for the desorber.

20. The device of claim 16 which comprises a pressure safety means for the desorber for controlling its pressure relative to the hydrostatic pressure of the washing liquid and the capillary pressure of the gas pores in the biporous absorber body.

21. The device of claim 16 which comprises means for controlling the hydrostatic pressure with the fuel cell relative to that within the absorber.

22. The device of claim 21 wherein the means are adapted to keep the average hydrostatic pressure in the washing liquid while in the absorber higher than the average pressure of the electrolyte in the fuel cell.

23. The device of claim 16 which comprises a pressure reducing means to control the gas inflow of the gas to be purified.

* * * * *